Nov. 24, 1953     H. T. OLSON     2,660,089

FILM INDEXING

Filed Jan. 21, 1949     4 Sheets-Sheet 1

Harold T. Olson
INVENTOR

BY
ATTORNEYS

Nov. 24, 1953  H. T. OLSON  2,660,089
FILM INDEXING
Filed Jan. 21, 1949  4 Sheets-Sheet 2
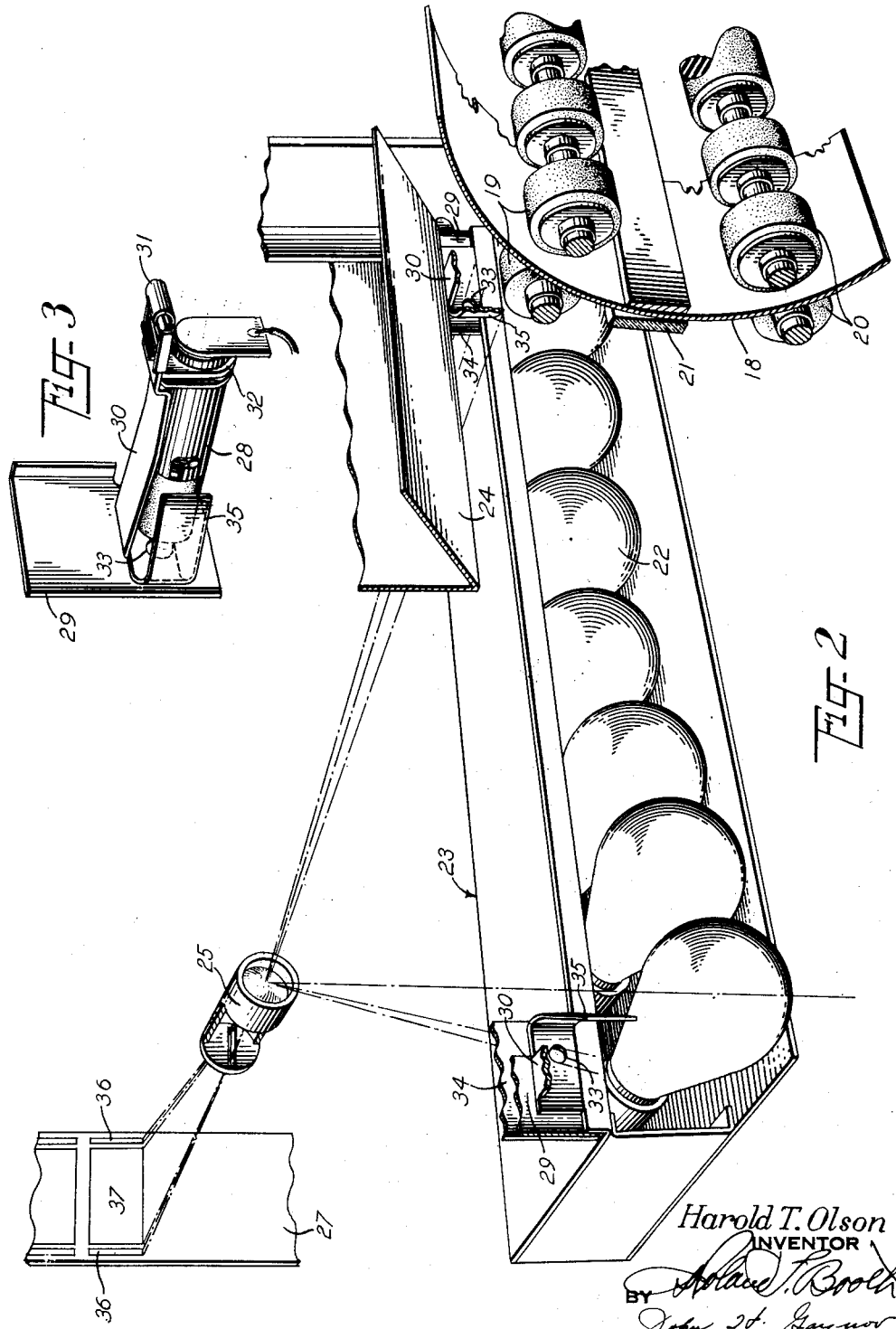
Harold T. Olson
INVENTOR
BY
ATTORNEYS Nov. 24, 1953 H. T. OLSON 2,660,089
FILM INDEXING
Filed Jan. 21, 1949 4 Sheets-Sheet 3
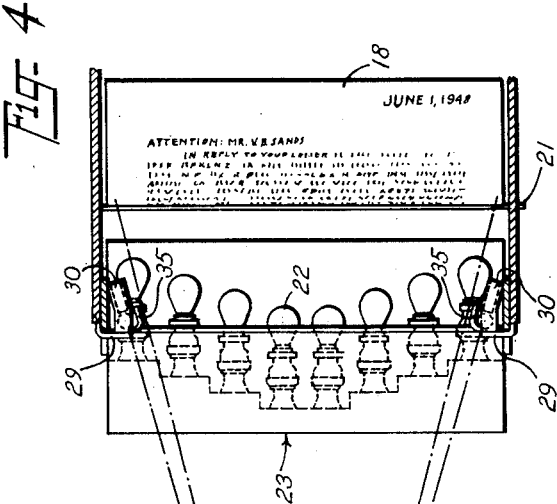
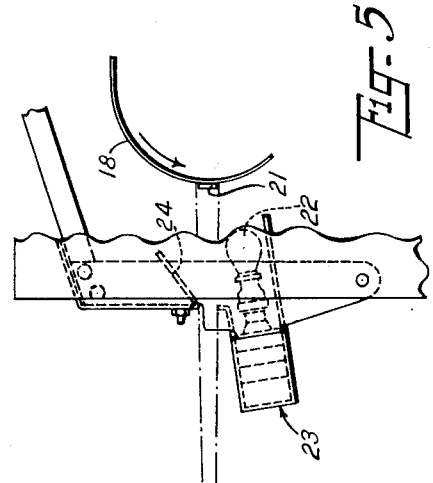
Harold T. Olson
INVENTOR
BY
ATTORNEYS
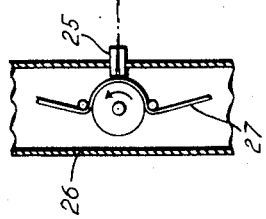

Nov. 24, 1953
H. T. OLSON
2,660,089
FILM INDEXING
Filed Jan. 21, 1949
4 Sheets-Sheet 4
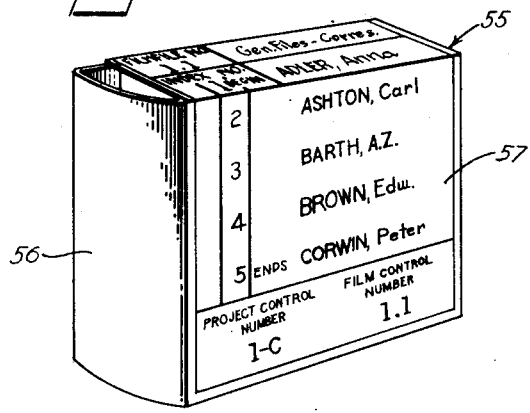
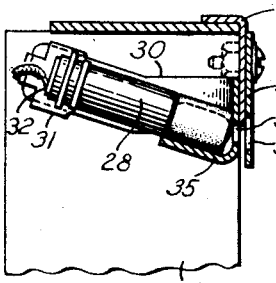
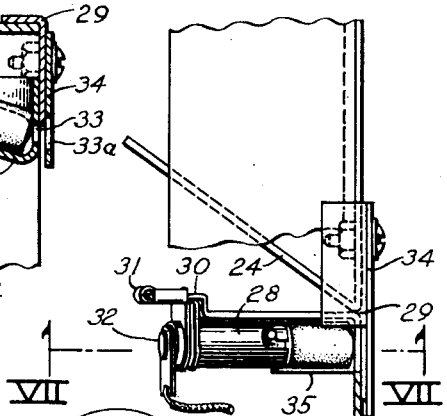
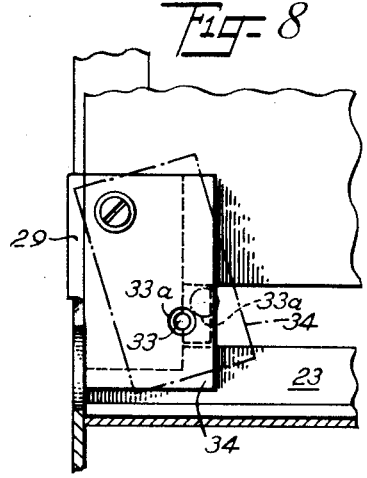
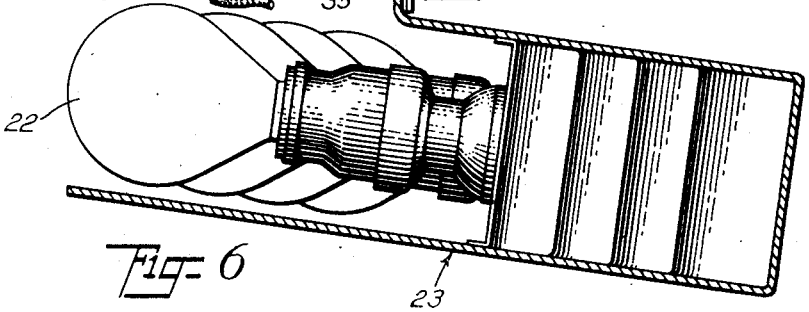
Harold T. Olson
INVENTOR
BY
ATTORNEYS Patented Nov. 24, 1953

2,660,089

UNITED STATES PATENT OFFICE 2,660,089

FILM INDEXING

Harold T. Olson, Baldwin, N. Y., assignor to Remington Rand Inc., New York, N. Y., a corporation of Delaware Application January 21, 1949, Serial No. 71,942

4 Claims. (Cl. 88—24)

This invention relates to a method of, and apparatus for, distinctively marking photographic film for indexing purposes.

Primarily the invention is applicable to the technique of microfilming documents for record purposes.

The normal one hundred foot length of microfilm may contain photographic reproductions of as many of three thousand documents and, as the usual method of inspecting any microfilm copy of a document is to project the image onto the screen of a reader, it is very desirable that some sort of indexing means shall be available to enable the operator of the reader to have quick access to at least the approximate position along the film of any document image which has to be viewed. It is with the provision for satisfactory method of indexing that the present invention is concerned.

The invention provides a method of photographically copying and indexing documents which consists in arranging said documents in a predetermined order, feeding them in that order into a photographic copying machine, operating said machine to expose successive stations of said film to the successively projected images of said documents as they are fed through the photographic field of the machine in the predetermined order, exposing said film to the projected image of a distinctive index mark simultaneously with exposure of said film to any selected projected document image or group of images, and processing said film to produce a photographic record of said documents with said index mark coextensive with said selected document image or images, whereby indexing can be achieved without interruption of the regular predetermined close spacing of document images on said film.

The invention also provides apparatus by means of which the method according to the present invention can be achieved in a convenient and efficient manner, such apparatus comprising means for feeding documents to be copied into and through the photographic field of the machine, light means for illuminating a document in the photographic field, optical means for focussing the illuminated image of said document onto photographic film, means for feeding film through the optical axis of said optical means, and indexing light means with associated switch means operable to project light onto said film characteristically to distinguish a portion of the developed film from an adjacent portion for indexing purposes.

In the drawings:

Fig. 2 is a perspective illustrating the relationship of a document in the photographic field of the machine to the illuminating means, the focussing means and the film, but in this view the index light means which comprise the essential feature of the present invention are omitted for clarity of illustration, the brackets for the indexing light means however are indicated partially broken away.

Fig. 3 is a fragmentary perspective showing an indexing light and manner of its attachment to a supporting bracket.

Fig. 4 is a plan view corresponding to Fig. 2.

Fig. 5 is a side elevation corresponding to Fig. 4.

Fig. 6 is a sectional elevation showing details of the lamp housing and the mountings of an indexing light.

Fig. 7 is a section on the line VII—VII of Fig. 6.

Fig. 8 is an elevation looking on the right-hand end of Fig. 7.

Fig. 11 is a perspective illustrating a container for a roll of processed film record available for projection, the container having associated with it a visible index related to film indexed in a manner in accordance with the present invention and intended to be housed in the container.

Figure 1:
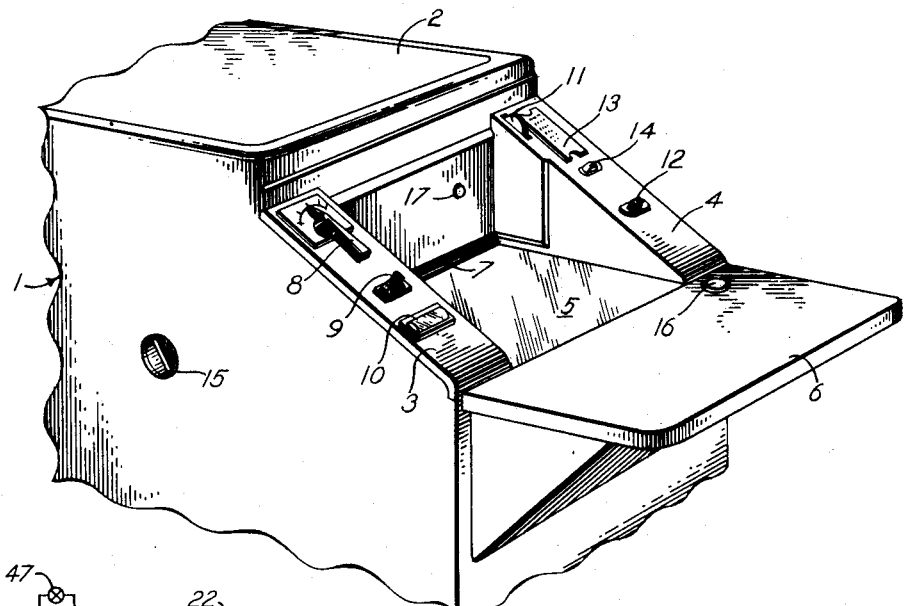
Fig. 1 is a fragmentary perspective showing the control panel and receiving end of a document photographic copying machine embodying the features of the present invention.

The forward upper part of the typical microfilm document photographic copying machine is seen in Fig. 1, wherein the reference numeral 1 indicates the casing having a hinged top 2 which gives access to the interior of the machine. Control panels 3 and 4 are provided on sloping side members which form the lateral boundaries of a work table 5. A document to be copied is placed on the work table and moved inwardly by hand until its leading edge enters the receiving slot 7 to an extent sufficient to ensure that it is caught by feed roller means within the machine. In front of the work table 5 there is preferably provided a forwardly extending detachable extension 6. The feed roller means carry the document into and through the photographic field for copying and discharge the document into a conveniently placed receiving tray. Trip mechanism is actuated by each document in the course of its travel through the machine whereby the document is illuminated only when it is in the photographic field. The illuminated image is projected onto a film in a camera accessible at the back of the machine, the camera being driven to feed film in a predetermined synchronized relationship with respect to the rate of document travel through the machine.

The controls on the control panel 3 comprise a regulator 8 which actuates a rheostat or equivalent device for controlling the intensity of document illumination in the photographic field, and a main switch 9 which controls the supply of electric current to the machine for driving the camera and feed rollers and for illuminating documents in the photographic field. 10 represents a counter device which indicates the number of photographic documents copied. On the control panel 4 the adjustment wheel 11 actuates what is known as a double thickness control stop by means of which, subject to initial adjustment to the thickness of any single document of a series of similar thickness documents to be copied, it can be ensured that only one document can feed through the machine at a time. 12 indicates what may be termed a spacer button which is simply a switch operable when it is desired to drive the film feed mechanism of the camera directly, independently of document feed, for example, when it is desired to increase the spacing of documents being photo copied on the film. The remaining items on the control panel 4 are merely an instruction plate 13 and a pilot light 14 which latter is illuminated at all times when the machine is operating properly. The opening 15 indicated in the side wall of the casing 1 is provided to give access for cleaning the glass plate, which will later be described, behind which the document is firmly located substantially flat in the photographic field.

The machine so far described is one of a type currently in use and shown and described in U. S. Patents 2,377,725, granted June 5, 1945; 2,492,127, granted December 20, 1949, and 2,537,529, granted January 9, 1951. The only outwardly visible points of difference which are introduced by the embodiment therein of the features of the present invention are the index light actuating switch button 16 and the index pilot light window 17.

The essential elements of the machine and the manner in which the additional features introduced by the present invention are embodied will now best be understood with reference to Figs. 2 to 10 inclusive. Thus in Figs. 2, 4 and 5 the reference numeral 18 represents a document to be copied. The document 18 is conveyed through photographic field by a cage or framework defined principally by a series of driven rollers engaging the back and front of the document so as to define a path of travel along which the document is fed from the inlet slot 7 (see Fig. 1) to a discharge opening below but not seen in Fig. 1. For the purpose of illustration it suffices to show part of two sets of feed rollers as indicated by the reference numerals 19 and 20, which are similar to the feed rollers of the document feed mechanism described in the aforementioned application and patents. The transparent plate 21 locates the document substantially flat in the photographic field at which the document is illuminated by lamps, e. g., 22 carried by the lamp housing 23. Above the lamp housing 23 there is mounted the inclined reflector 24 which it will be noted has its lower edge in spaced relationship with respect of the top edge of the lamp housing 23 to define a slot through which the illuminated image of that part of the document 18 for the time being in the photographic field defined behind the glass plate 21 is focused through the lens mount 25 of the camera 26 (see also Figs. 4 and 5) onto the film 27. The principle upon which the particular machine now being described operates involves feeding the document 18 downwardly through the photographic field while the film 27 is fed upwardly at a predetermined speed in relation to document feed, all of which, including the means for rendering the illumination effective only when the document is in the photographic field, is well known in the art, is shown in the aforementioned application and patents and calls for no further description.

Essentially the present invention is concerned with the method of and the means for indexing the film which will now be described.

An indexing lamp enclosed within a tubular housing 28 (see Figs. 3, 4, 6 and 7), open at the front, is mounted at the extreme edges of the photographic field to project light onto the marginal portion of the film 27.

The manner of mounting the indexing lamp is best illustrated in Figs. 2, 3, 6, 7 and 8 from which it will be seen that a support plate 29 mounted on top of the lamp housing 23 at each end thereof carries a bracket having a lamp support arm 30 (shown partly broken away in Fig. 2), the free end of which is engaged by the spring clip device 31 incorporated with the terminal fitting 32 of the index lamp housing 28. Light from the index lamp when it is actuated for indexing purposes shines directly onto a marginal portion of the film 27 through a light aperture 33 of each lamp support bracket and through an aperture 33a in an index light aperture adjustment or masking plate 34 also carried by the support plate 29 (see Fig. 8). To prevent light from the index lamp reducing the intensity or contrast of the reflected image the lamp support bracket in addition to the lamp support arm 30 also embodies a curved masking portion 35.

In the construction shown provision is made for mounting an index lamp at each edge of the photographic field so that light from each lamp is projected through the aperture defined between the lower edge of the reflector 24 and the upper edge of the lamp housing 23. The arrangement is such that, with both lights effective, light from the index lamps is projected onto the marginal portions of the film as indicated at 36 alongside and coextensive with the light projected from the document indicated on the film at 37. It is, however, to be understood that in many cases it suffices to provide only one index lamp so that the light therefrom is projected onto the marginal portion of a film at one side only, or at some other convenient point.

The index lamp is intended to be actuated by means of the press button switch 38 (see Fig. 9) which conveniently is mounted on the forward extension 6 of the work table 5 so that the press button 16 is readily accessible to the operator. As the work table extension 6 is preferably detachable, it is desirable that the press button switch shall be readily removable too, and the switch as shown has a plug fitting 39 (see Figs. 9 and 10) for engagement in a socket 40 (see Fig. 10) electrically connected with the index lamp circuit.

Figure 10:
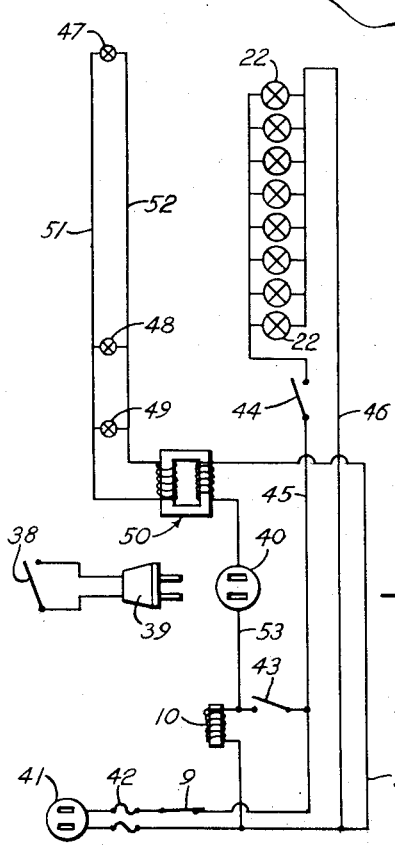
Fig. 10 is an electrical circuit diagram of the document illuminating means and the indexing lights.
Figure 9:
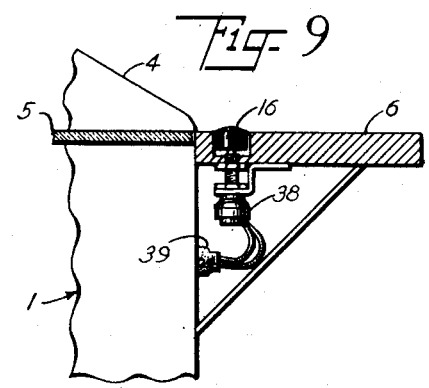
Fig. 9 is a detailed fragmentary section illustrating the mounting of the index lamp actuating switch.

Obviously the index lamps can be of low voltage compared to that of the lamps 22, and it is convenient to tap off from a transformer the low voltage current for the index lamps and the associated pilot light. Fig. 10 therefore shows the circuit in which the main power connection is indicated at 41; 42 presents the customary fuses and 9 the main switch. 43 indicates a counter actuating switch, which is tripped by each document in its passage through the machine to actuate the counter diagrammatically represented at 10 and corresponding to that showing in Fig. 1, and 44 is a document actuated switch which is tripped by each document for illumination in the photographic field, the switch 44 being associated with a timing relay circuit to ensure that it remains closed so long as the document is in the photographic field. The document illuminating lamps are seen at 22, and the current flows thereto along the wires 45 and 46 when the switch 44 is closed. The index lamp circuit feeding the two index lamps 47 and 48 and the index light pilot lamp 49, which pilot lamp is visible through the window 17 of Fig. 1, is taken off the secondary winding of the transformer 50 through the current leads 51 and 52. The primary of the transformer 50 is connected across the main current through the leads 53 and 54 only when the primary circuit is completed on closing of switch 38 by actuation of the press button 16 (see Figs. 1 and 9) with the plug 39 engaged in the socket 40.

The projection of light from the index lamp onto a marginal portion of the film is an important feature of the invention because it enables the index mark to be employed without wastage of space between adjacent images and thus the whole length of the film may be occupied by photographic images of copied documents without disturbing the normal close spacing of the images on the film. It is to be understood, however, that in some machines a plurality of images appear side by side across the film in laterally spaced relationship, such a case occurs, for example, in machines which are devised to copy photographically the back and front of a document simultaneously, so that the two images of the same document appear side by side in spaced relationship, and in such apparatus it is quite feasible so to direct the index lamp that its light impinges upon what in the processed film becomes the space between adjacent document images on the film. Thus where in the specification, and in certain of the ensuing claims reference is made to the "marginal portion" of the film, it is to be understood that a marginal portion can be any part of the film throughout its width not occupied by what in the finished film becomes a document image, and the term should not read as restricted to the meaning that a marginal portion is essentially at an edge of the film.

In operation of the machine to embody the method in accordance with the invention, the documents to be microfilmed are first arranged in some predetermined order, for example, in alphabetical order or in numerical order or in order of date, according to the nature of the intended record. Having done that, the pile of documents is placed readily to hand and the operator, after switching the machine on, selects them, taking each in turn and, placing it onto the work table of the machine, feeds it toward the receiving slot 1 until the leading edge of the document is accepted by the feed rollers to be fed through the photographic field and out of the discharge end of the machine into a conveniently placed receiving tray. The film commonly used for microfilming is approximately 100 feet in length and, as an example of what may be done in the manner of indexing, it can be stated that it will often suffice to provide the indexing mark coextensively with a consecutive series of images at, for example, four or five points equidistantly spaced throughout the length of the film. It is, however to be understood that the indexing of the film is very flexible in regard to what may be done, for example, in certain cases it may be convenient for an operator, having photographed all the correspondence which would be filed under the initial letter A, to actuate the indexing light to index the film coextensive with, say the first five or six images of documents which would normally be filed under the initial letter B, thus indicating the point at which the A correspondence ends and the B correspondence starts. One advantage of the method according to the present invention is that the operator can actuate the indexing means as many times as desired throughout the length of the film without wasting any space between images. To apply the indexing marking to the film the operator merely has to press the index switch button 16, which preferably is of the type which, when once actuated is held in, until it is deliberately actuated again for release. Such an arrangement is desirable because it does not interfere with the operator's action of feeding in the documents successively, and he can therefore actuate the switch, feed in the next five or six documents, and the index mark will be repeated coextensively therewith until such time as the switch is actuated again for release.

When the actual microfilming operation has been completed the film is removed from the camera and processed in the normal way, following which it is customary, in order to make sure that the photographic reproductions are satisfactory, to inspect each film on a reader which magnifies and projects the photographic image onto a screen so that it can be read, and, in the fullest embodiment of the invention, it is intended that the inspector should in the course of inspection make a written record or key indicating which groups of documents end and begin with reference to the various index markings on the film.

Fig. 11 is a perspective view showing a typical container for film having a written index applied to it in order that it may be permanently associated with the particular film to which it relates. As shown in Fig. 11 the index includes spaces for general office references, the film number etc., and the numbers which appear under the heading "Index No." correspond to the consecutive positions at which the index mark is applied to the film. In the particular case illustrated the general file correspondence starts with correspondence under the name Adler, Anna. In this case the operator continued photographing all the correspondence taken in alphabetical order between "Adler, Anna" and "Ashton, Carl" before it was decided to operate the indexing lamp control switch at the first intermediate index point in the length of the film. From the index illustrated it is obvious to any operator of the reader that correspondence photographed on that reel started with that related to "Adler, Anna" and finished with that related to "Corwin, Peter" and, if, therefore, the operator wants to turn up correspondence related to the subject of "Edward Brown" he installs the film in a reader and traverses the film as rapidly as desired counting the various index points as they are projected onto the reader screen until he gets to the fourth indexing point, at which he could then be sure that he was in the region of the film covering the "Brown" correspondence. The rapidity of film traverse can be such that the images are projected in such rapid succession that they are not individually recognizable but, even so, the persistence of human vision makes it possible easily to recognize the repeated index mark.

If it should so happen that the correspondence which the operator desires to inspect was filed under the name, for example, "John Brown" he would know that the "John Brown" correspondence would appear shortly after the "Edward Brown" correspondence, and it is therefore a simple matter for him to project the images subsequent to the fourth indexing point in comparatively slow successive order onto the reader screen by slowing down the rate of film feed to enable the successively projected images to be recognizable until the particular item of correspondence required is projected, whereupon the operator stops the reader to enable the projected image of the document to be read.

The container may be of any convenient form but as shown it is simply a cardboard box 55 with a folding lid 56 through which the film is accessible and the typewritten index is applied to the box as a label 57.

The invention claimed is:

1. Photographic document copying apparatus comprising means for feeding documents to be copied into and through the photographic field of the machine, light means for illuminating a document in said photographic field, a lamp housing enclosing a portion of a document for the time being in the photographic field, an edge portion on said lamp housing, a reflector adapted and arranged to concentrate light from said lamp onto said portion of a document and having an edge disposed in spaced parallel relationship with respect to said edge portion on said lamp housing to define an elongated slot, plate means at each end of said slot having an inner end portion extending between said edge and said edge portion to limit the endwise extent of said slot, means on the opposite side of said slot from said photographic field for mounting and feeding sensitized photographic film strip longitudinally through a plane parallel to and in alignment with the portion of an image for the time being in the photographic field, optical means for focussing an image of said portion of a document onto a central portion of said film strip leaving a marginal portion of said film strip unexposed, an index light housing enclosing an indexing lamp adapted and arranged to direct light from said lamp through an aperture in said plate means for focussing onto said marginal portion of said film and switch means operatively associated with the indexing lamp and selectively operable to expose to a projected light image from said indexing lamp a marginal portion of said film alongside and coextensive with any selected document image whereby, in the developed film, a distinctive index mark is visible coextensive with a selected document image.

2. Photographic document copying apparatus as set forth in claim 1 in which said plate means comprises a plurality of apertured members, the apertures of which are alignable to define a light aperture permitting projection therethrough of light from said index lamp onto said film, one of said apertured members being adjustable with respect to the other for variation of the orifice area of said light aperture.

3. Photographic document copying apparatus as set forth in claim 1 including a bracket means mounting said index lamp on the same side of said plate means as said photographic field, said bracket means including masking means concentrating light from said index lamp for projection through said light aperture.

4. The method of indexing lengths of film in flow-film photography consisting in feeding pre-indexed discrete documents successively past an illuminated aperture at a relative rate of feed, simultaneously projecting a focused light beam onto an unused strip portion of said film with exposure of said film to a series of consecutively fed document images, and producing substantially continuous, uniformly exposed, elongated longitudinally extending index strip portions on said film, selectively interrupting the projection of said light beam at discriminate intervals throughout exposure of the length of film to provide relatively elongated spaced unexposed aligned longitudinal strip portions, processing said film whereby said unexposed strip portions are substantially transparent for transmission of light therethrough and said exposed index strip portions are substantially opaque to prevent the transmission of light, said exposed strip portions being representative of index stations coextensive with the series of document images at intervals spaced throughout the length of film, and finally producing a record key specific to said film indicating the position of selected document images with respect to the adjacent index strip portions whereby feeding of said length of film through a film projector will enable visible observation of said index strip portions by projection on the image projection screen of said projectors while the film is being fed at higher speeds than that required for visual reading of document images recorded on the film enabling quick location of a desired document image for inspection directly through cooperation of said index strip portions and said record key.

HAROLD T. OLSON.

References Cited in the file of this patent

UNITED STATES PATENTS

| Number | Name | Date |
| --- | --- | --- |
| Re. 22,517 | Hopkins | July 18, 1944 |
| 1,442,297 | Riedel | Jan. 16, 1923 |
| 1,548,019 | Babson | Aug. 4, 1925 |
| 1,810,002 | Arnold | June 16, 1931 |
| 1,817,723 | Armitage | Aug. 4, 1931 |
| 1,826,664 | Hopkins | Oct. 6, 1931 |
| 1,889,575 | Sebille | Nov. 29, 1932 |
| 2,440,797 | Clough | May 4, 1948 |

FOREIGN PATENTS

| Number | Country | Date |
| --- | --- | --- |
| 269,886 | Germany | Feb. 2, 1914 |